Oct. 26, 1965     R. G. GOLDMAN     3,213,675
PULSED ULTRASONIC IMAGE CONVERTER
Filed April 21, 1961
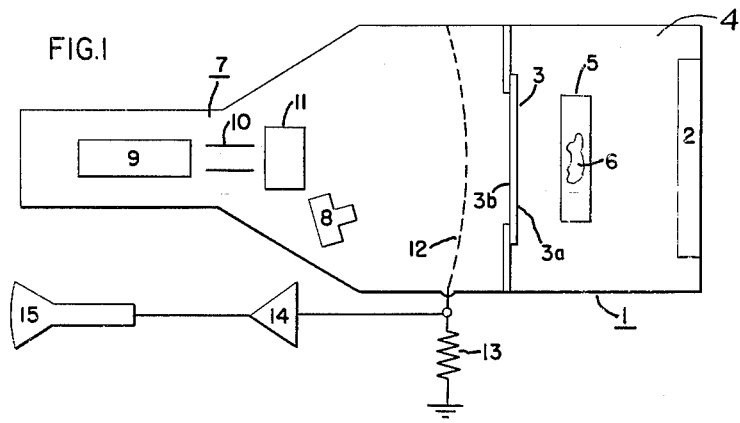
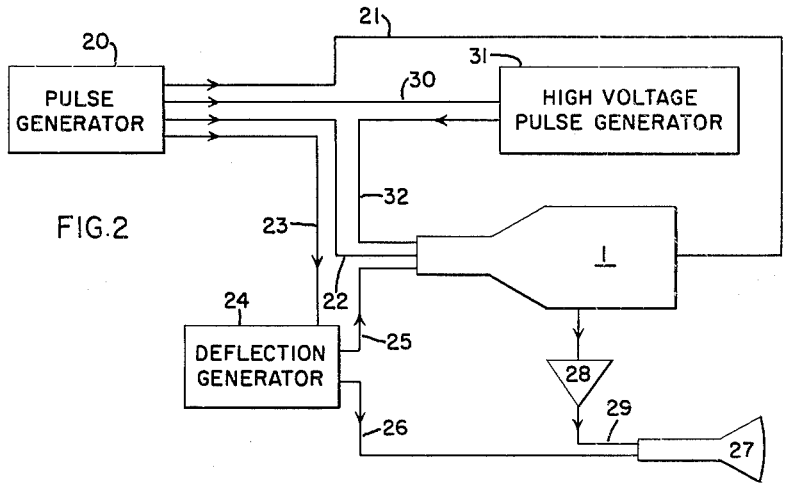
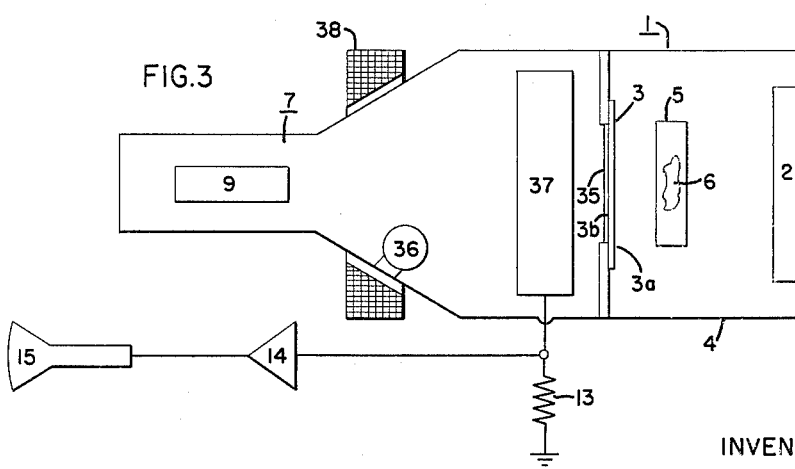
INVENTOR:
RICHARD G. GOLDMAN,
BY
HIS ATTORNEY.

United States Patent Office 3,213,675
Patented Oct. 26, 1965

3,213,675
PULSED ULTRASONIC IMAGE CONVERTER
Richard G. Goldman, Schenectady, N.Y., assignor to General Electric Company, a corporation of New York
Filed Apr. 21, 1961, Ser. No. 104,648
14 Claims. (Cl. 73—67.5)

This invention relates to ultrasonic image converters and more particularly to an improved method and apparatus for testing objects with the use of ultrasonic pressure wave energy.

Ultrasonic image converters are known which may be used to detect voids and other flaws in solid objects. These known devices operate basically as follows: A transmitting transducer, such as a crystal of quartz, or barium titanate, generates a continuous, usually sinusoidal, ultrasonic pressure wave which irradiates the object to be examined. Any voids or irregularities in this object cause the ultrasonic waves which pass through the object to fall on a receiving plate, which is also made of a crystal such as quartz or barium titanate, with variable intensity so that a shadow graph of the examined object exists on the face of the receiving plate. A highlight is represented on the plate at a point or area where the maximum amplitude of the applied sinusoidal ultrasonic pressure wave is large and a shadow at a point or area where the corresponding amplitude is small.

The properties of the receiving plate are such that a mechanical stress therein will result in a proportional voltage or potential at that point. If the receiving plate is used as the target of a cathode ray tube and if the received ultrasonic wave irradiates the outer surface of the receiving plate, then there will appear on the inner surface a varying voltage or potential whose amplitude, shape and frequency correspond to the externally applied ultrasonic pressure wave after its passage through the object and any possible flaw or defect. An electron beam may then scan the interior surface of the receiving plate. The arriving electrons in the electron beam will then either be repelled themselves or cause secondary electron emissions; in either case, the electrons arriving back at a collector ring in the cathode ray tube will be modulated by the varying voltage across the receiving plate caused by the ultrasonic pressure wave. The electrons flowing from the collector ring to an amplifier and demodulator will then be similar to the video signal from a television pickup and can be amplified and acted upon so as to give a visual presentation of the ultrasonic pressure pattern on an ordinary kinescope monitor tube. Such systems are used to perform the same operation as an X-ray apparatus but do so safer, cheaper and more sensitively.

However, it has been found that a basic difficulty exists in such systems. The ultrasonic image converters known in the prior art have employed continuous ultrasonic pressure waves. The continuous passage of the ultrasonic pressure waves through a medium creates standing waves in the medium and the slightest movement of the transducer, examined object, receiving plate or any other part of the apparatus will cause disturbances of the standing wave pattern with accompanying obliteration or distortion of the observed image. Also, standing wave patterns make it difficult if not impossible to examine large castings in which the thickness of the section changes rapidly and by large amounts.

It is accordingly an object of this invention to provide an improved ultrasonic image converter.

It is another object of this invention to provide an improved ultrasonic image converter in which no standing waves are set up in any medium through which the ultrasonic waves may pass.

It is another object of this invention to provide an improved ultrasonic image converter which may be used to examine large articles wherein the thickness of the section changes rapidly.

It is yet another object of this invention to provide an improved ultrasonic image converter in which the ultrasonic energy is supplied to the object under test in pulses rather than in a continuous wave.

It is yet another object of the invention to provide an improved method of ultrasonic testing.

It is still a further object of this invention to provide an improved method of ultrasonic testing utilizing pulsed ultrasonic energy.

Briefly stated, and in accordance with one embodiment of the invention, an ultrasonic image converter is provided in which the transmitting transducer is energized periodically such that a series of pulses of ultarsonic pressure wave energy is emitted rather than a continuous wave of ultrasonic energy. It has been found that the pulses of ultrasonic energy may be sufficiently short and have sufficient spacing between them such that no standing waves will be set up in the mediums or objects through which the waves are passed. During the period that an ultrasonic pulse is arriving or striking the exterior face of the receiving plate, the interior face of the receiving plate is sprayed by a uniform flow of electrons of approximately zero velocity. The points of the interior surface which become positive with respect to the reference potential will attract these electrons and the points on the interior face which become negative with respect to this reference potential will repeal these electrons; consequently each point will become changed with electrons in direct proportion to the amplitude of the ultrasonic wave being applied to the corresponding point on the exterior face. When the exterior pulse ceases, the electron spray is also caused to cease. Thus, a charge pattern is formed on the interior surface representing the ultrasonic pressure pattern which exists on the exterior surface of the receiving plate. An electron beam is then scanned over the entire interior face of the receiving plate point by point, the emitted electrons from each point subsequently being collected by a collector electrode and the resulting video signal amplified and applied to a grid of the synchronized kinescope in a manner well known in the art. A visual representation is thereby obtained of any variations or flaws in the examined object. Thus, in accordance with the invention, the shadowgraph picture is free of any standing wave distortion or interference patterns.

For a complete understanding of the invention, reference may be had to the accompanying figures, in which:

FIG. 1 shows an ultrasonic image converter according to the invention;

FIG. 2 is a block diagram of a system for ultrasonic image conversion utilizing the ultrasonic converter of the invention shown in FIG. 1; and FIG. 3 shows a second embodiment of an ultrasonic converter of the invention.

Referring now to FIG. 1, therein is shown an ultrasonic image converter 1 according to the invention which includes the source of ultrasonic energy 2, which may be a pulse oscillator in conjunction with a transmitting crystal or the like, and a receiving plate 3. The properties of the receiving plate 3, which may be a crystal structure such as quartz or barium titanate, are such that mechanical stresses therein are converted into proportional potentials on the surface thereof. The source 2 and the receiving plate 3 are positioned within a tank 4, which may be filled with a suitable fluid such as kerosene. The object under test 5 is positioned between the source 2 and a first side 3a of the receiving plate 3. The walls of the tank 4 may be covered with felt or other suitable material to prevent reflection of ultrasonic energy within the tank 4. The outer surface, 3a of the receiving plate 3 may have a conductive coating thereon.

The second or inner surface 3b of the receiving plate 3 serves as a target electrode for a cathode ray scan tube 7, which includes an electron flood gun 8, a scan gun 9 and suitable deflection electrodes 10, 11 to deflect the electron beam from the scan gun 9. The cathode ray tube 7 also includes a mesh electrode 12, which functions both to focus the electron beam from the flood gun 8 and to collect electrons during the scanning operation as will be later described.

In accordance with the method of the invention, the operation of the device 1 is as follows: The source 2 is periodically energized such that it will emit pulses of ultrasonic energy which will pass through the fluid in the tank 4, through the object under test 5 and impinge upon the first or outer surface 3a of the receiving plate 3. Any voids, discontinuities, or other defects 6 which may be within the object 5 will transmit the ultrasonic energy differently and thus the pressure pattern of the ultrasonic energy impinging upon the first surface 3a of the receiving plate 3 will be indicative of any voids or defects which may be within the object 5. While the source 2 emits sinusoidal pressure waves, the pressure pattern on the first surface 3a of the receiving plate 3 will be varying pattern whose amplitude, shape and frequency correspond to the pressure pattern of the ultrasonic energy passed through the object 5. Due to these properties of the receiving plate 3, a voltage pattern will then appear on the second or inner surface 3b of the receiving plate 3, which corresponds to the pressure pattern appearing on the first surface thereof.

During the interval that the ultrasonic energy impinges upon the first side of the receiving plate 3, the flood gun 8 is energized such that a uniform flood of electrons impinges upon the second surface 3b of the receiving plate 3. The electrons emitted by the flood gun 8 are controlled by the mesh electrode 12 in such a manner that they arrive at the second surface of the receiving plate 3 substantially normal thereto and at substantially zero velocity. The electrons arriving will be attracted to those points along the second surface of the receiving plate 3 which have a positive voltage thereon due to the mechanical stresses caused by the ultrasonic energy and will be repelled from those points having a negative voltage thereon. When ultrasonic energy ceases to impinge upon the first surface 3a of the receiving plate 3, due to the deenergizing of the source 2, the flood gun 8 is also deenergized. There will thus remain on the second surface 3b of the receiving plate 3 a negative charge pattern which is indicative of the pressure pattern of the ultrasonic energy which had impinged upon a first surface 3a of the receiving plate 3.

During the interval between ultrasonic energy pulses, the scan gun 9 is energized, with the electron beam therefrom being controlled by the deflection plates 10, 11 such that the second surface 3b of the receiving plate 3 having the charge pattern thereon is scanned in a conventional manner by an electron beam. The reflected or emitted electrons from the second surface 3b of the receiving plate 3 are then gathered by the mesh electrode 12 which serves as a collector electrode which is hereinafter more fully described. A resistance 13 is connected between the mesh 12 and a reference potential. There will thus appear across the resistance 13 a video signal indicative of the charge pattern upon the second surface 3b of the receiving plate 3 and thus indicative of the pressure pattern of the ultrasonic energy which impinged upon the first surface 3a of the receiving plate 3. This video signal may be amplified by any suitable amplifier 14 and then is connected to a suitably synchronized viewing kinescope 15 which provides a visual representation of the pressure pattern.

After the receiving plate has been completely scanned by the scan gun 9, the scan gun 9 is deenergized and the flood gun 8 is energized to neutralize the charge pattern on the inner surface 3b. In a manner to be more fully described, a positive potential of about 200 volts is simultaneously applied to the conductive coating on the outer surface 3a and the mesh electrode 12 is driven to ground, causing more electrons to leave the surface 3b than arrive from the flood gun 8 until the surface 3b is at ground potential. The plate 3 is then neutral once again and is ready to once again repeat the operation as described.

Referring now to FIG. 2, therein is shown a pulsed ultrasonic image converter 1 such as was shown in FIG. 1 being utilized in a system for ultrasonic testing. The operation of this block diagram system may be explained by the following time sequence of operation and FIG. 1 may be again referred to for details of some of the elements of the image converter 1 as may be mentioned hereafter.

At time $t$ equals zero, the pulse generator 20 transmits a synchronizing pulse through conductor 21 to the ultrasonic energy source 2 (FIG. 1), which causes the source 2 to begin the generation and transmission of ultrasonic energy into the tank 4 of the device 1. At time $t$ equals 10 microseconds, the source 2 ceases to generate ultrasonic energy. Thus, if the source 2 transmits ultrasonic energy at a frequency of 1 megacycle per second, 10 cycles are transmitted. The transmitted pulse of ultrasonic energy requires a finite amount of time to traverse the tank and object under test. For example, at time $t$ equals 70 microseconds, the leading edge of the transmitted pulse of ultrasonic energy may arrive at the outer surface 3a of the receiving plate 3. At this time, a pulse from the pulse generator 20 is applied through conductor 22 to the grid of the flood gun 8, rendering the flood gun operative. The flood gun then sprays the inner surface 3b of the receiving plate 3 with a uniform coating of electrons. At time $t$ equals 80 microseconds, the transmitted ultrasonic energy ceases to arrive at the outer surface 3a of the receiving plate 3. At this time, the pulse is removed from the grid of the flood gun 8 and the flood gun ceases to generate an electron beam. A negative charge pattern then exists on the inner surface 3b of the receiving plate 3 which is indicative of the pressure pattern of the ultrasonic energy on the outer surfaces of the receiving plate.

This charge pattern is then scanned in any conventional manner, such as with an electron beam, to obtain a video signal indicative of the charge pattern. For example, at time $t$ equals 100 microseconds, the scanning operation may begin. At this time, the pulse generator 20 sends a pulse to the grid of the scan gun of the device 1, thereby unblanking it and causing an electron beam to strike the receiving plate. At the same time, the pulse generator 20 sends a synchronizing pulse through conductor 23 to the deflection generator 24, causing horizontal and vertical deflection voltages to be applied through conductors 25 and 26 to the horizontal and vertical deflection plates of the scan gun of the device 1 and the kinescope 27. Thus, synchronization between the kinescope 27 and the device 1 is assured. The electron beam then scans each point of the interior surface 3b of the receiving plate 3 in the same manner as a television pickup tube, and the electrons returning from the receiving plate will be attracted to the mesh electrode 12 of the device 1. The video signal output from the device 1 may be amplified by any suitable amplifier 28, and the output thereof is applied to the control electrode of the kinescope 27 through conductor 29. The kinescope 27 thereby gives a visual representation of the charge pattern on the inner surface 3b of the receiving plate and thus of the ultrasonic pattern on the outer surface 3a of the receiving plate.

If each horizontal scan requires 100 microseconds and the resulting kinescope picture requires 100 lines, the total time for the scanning operation will thus be 10,000 microseconds. Thus, at time $t$ equals 10,100 microseconds, the scanning operation will end. At this time, the scan gun of the device 1 and the deflection voltage oscillators of the deflection generator 24 are rendered inoperative by the pulse generator 20.

The charge pattern existing on the interior of the receiving plate may now be neutralized or erased in preparation for the succeeding ultrasonic energy pulse. Thus, at time *t* equals 10,200 microseconds, the pulse generator 20 applies a pulse to the grid of the flood gun 8, once again activating the flood gun. At the same time, the pulse generator 20 applies a pulse through conductor 30 to high voltage pulse generator 31, which in turn applies a pulse of large negative magnitude, for example about −1200 volts, through conductor 32 to the mesh electrode 12, thereby driving it to ground potential. At the same time, the high voltage pulse generator 31 also applies a positive voltage, for example about 200 volts, to the conductive coating on the outer surface 3a of the receiving plate. Thus, with the inner surface 3b of the receiving plate at approximately ground potential and the exterior surface 3a at about +200 volts, the receiving plate is above the first crossover point so that more electrons are emitted from the interior surfaces than are arriving from the flood gun. The inner surface 3b is originally slightly negative from the flood and read operations, so that emitted electrons are attracted to the mesh electrode 12 which is at ground potential and therefore slightly positive with respect to the inner surface 3b of the receiving plate. The inner surface 3b thereafter becomes more positive until it also reaches ground potential, at which time the electrons are no longer attracted to the mesh electrode 12, the inner surface 3b thus being returned to ground potential. At time *t* equals 11,000 microseconds, the neutralization of the charge pattern is completed. The pulses to the flood gun grid, the mesh electrode 12 and the outer coating 3a of the receiving plate are now discontinued. The receiving plate is now once again ready to receive the subsequent pulse of ultrasonic energy and the system is now ready to repeat the cycle as described. For example, if it is desired to display 60 frames per second on the kinescope 27, at approximate time *t* equals 16,600 microseconds, the pulse generator 20 will once again trigger the ultrasonic energy source into operation and the cycle as described will be repeated.

Referring now to FIG. 3, therein is shown a second embodiment of ultrasonic image converter device 1 in accordance with the invention. The device is similar to that shown by FIG. 1, with the primary difference being that a photosensitive coating 35, such as a layer of zinc sulfide, is provided on the inner surface 3b of the receiving plate 3 and a light source 36 replaces the flood gun 8 of FIG. 1.

The operation of this embodiment is as follows: When the ultrasonic energy from the source 2 is impinging upon the outer surface 3a of the receiving plate 3, the light source 36 is energized such that light impinges on the photosensitive coating 35 on the inner surface 3b of the receiving plate 3. This impinging light causes electrons to leave the surface of the coating 35, with the amount of electrons leaving any particular point thereon being dependent upon the potential of the point, which is in turn dependent upon the pressure pattern of the arriving ultrasonic energy. Thus, a positive charge pattern indicative of the arriving pressure is established on the inner surface 3b of the receiving plate 3, as contrasted with the negative charge pattern of the embodiment shown in FIG. 1.

The inner surface 3b of the receiving plate 3 is scanned by the scan gun 9 in a manner similar to that described in the previous embodiment and a video signal is obtained in the same manner. However, it will be noted here that if the scanning current from the scan gun 9 is sufficiently large, the electron scanning beam will neutralize the positive charge pattern on the surface 3b as the surface is scanned, thereby obviating the necessity of the subsequent neutralization of the charge pattern, as was required in the embodiment shown in FIG. 1.

In the embodiment of FIG. 3, the collector ring 37 replaces the mesh electrode 12 of the embodiment of FIG. 1, since there is no longer any need to control a uniform flow of electrons onto the receiving plate 3. The collector ring 37 thus provides no interference with the scanning beam of the scan gun 9. Also, magnetic deflection means 38 may be utilized instead of the deflection plates of the embodiment in FIG. 1, thereby providing more accurate control of the scanning beam.

While the invention has thus been described and several embodiments shown, the invention is obviously not limited to these shown embodiments, but instead many modifications will occur to those skilled in the art which will lie within the spirit and scope of the invention. For example, any suitable source of pulse ultrasonic energy may be utilized with the invention and any suitable means may be used to obtain a video signal from the stored charge pattern. The invention may include any device for periodically passing ultrasonic pressure energy through an object being tested and converting the passed ultrasonic energy to a signal to provide an indication of the pattern of passed ultrasonic energy, with the converting operation occurring through intervals between periods for passing ultrasonic energy through the object. It is thus intended that the invention be limited in scope only by the appended claims.

What is claimed as new and desired to secure by Letters Patent of the United States is:

1. The method of ultrasonic testing which comprises, periodically passing periodic pulses of ultrasonic pressure energy in a given direction through the object to be tested, and converting the ultrasonic energy passed through said object to an electrical charge which is continuous over an area perpendicular to said direction to provide an indication of the ultrasonic energy passing through said object, directing a flood of electrons at substantially zero velocity at and co-extensive with said area, directing a flow of electrons at said area and detecting the electrons reflected therefrom to provide an indication of the ultrasonic energy passing through said object.

2. The method of ultrasonic testing which comprises, periodically passing periodic pulses of ultrasonic pressure energy in a given direction through the object to be tested, and converting the ultrasonic energy passed through said object to an electrical charge which is continuous over an area perpendicular to said direction and is indicative of the ultrasonic energy passing through said object directing a flood of electrons at substantially zero velocity at and co-extensive with said area, directing a flow of electrons at said area and detecting the electrons reflected therefrom during intervals between periods for passing ultrasonic energy through said object to provide an indication of the ultrasonic energy passing through said object.

3. The method of ultrasonic testing which comprises, periodically passing periodic pulses of ultrasonic pressure energy in a given direction through the object to be tested, converting the ultrasonic energy passed through said object to an electrical charge having a continuous distribution pattern corresponding to the pattern of ultrasonic energy passing through said object, directing a flow of electrons at substantially zero velocity at and co-extensive with said electric charge pattern to retain said charge pattern, and periodically scanning the continuous charge pattern during intervals between the periods of ultrasonic energy to provide a video signal representative of the pattern of ultrasonic energy passing through said object.

4. The method of ultrasonic testing which comprises, periodically passing periodic pulses of ultrasonic pressure energy in a given direction through the object to be tested, converting the ultrasonic energy passed through said object to an electrical charge having a continuous distribution pattern corresponding to the pattern of ultrasonic energy passing through the object, periodically scanning the charge pattern during intervals between the periods for passing ultrasonic energy through said object to provide a video signal representative of the pattern of ultrasonic energy passing through said object, and neutralizing the charge pattern during intervals between the scanning period and the period for passing ultrasonic energy through said object.

5. The method of ultrasonic testing which comprises, periodically passing periodic pulses of ultrasonic pressure energy in a given direction through the object to be tested, converting the ultrasonic energy passed through said object to an electrical charge having a continuous distribution pattern corresponding to the pattern of ultrasonic energy passing through said object, directing a flood of electrons at substantially zero velocity at and co-extensive with said electric charge pattern to retain said charge pattern, and periodically scanning said charge pattern during intervals between the periods for passing ultrasonic energy through said object to produce a visible pattern corresponding to the pattern of ultrasonic energy passing through said object.

6. The method of ultrasonic testing which comprises, periodically passing periodic pulses of ultrasonic pressure energy in a given direction through the object to be tested, converting the ultrasonic energy passed through said object to an electrical charge pattern having a continuous distribution corresponding to the pattern of ultrasonic energy passing through said object, periodically scanning said charge pattern during intervals between the periods for passing ultrasonic energy through said object to produce a visible pattern corresponding to the pattern of ultrasonic energy passing through said object, and neutralizing said charge pattern during intervals between the periods for scanning and for passing ultrasonic energy through said object.

7. An ultrasonic image converter comprising a receiving plate in which mechanical stresses therein produce a proportional potential, a source for generating and directing periodic pulses of ultrasonic pressure energy toward one side of said receiving plate, means for positioning an object to be tested between said receiving plate and said source in the path of said ultrasonic energy whereby ultrasonic energy is passed through said object to reach said one side of said receiving plate, said receiving plate producing an electrical charge on the other side of said receiving plate, the distribution pattern of said electrical charge being continuous and corresponding to the potentials in said receiving plate created by mechanical stresses therein, means for directing a flood of electrons at substantially zero velocity at and co-extensive with said electrical charge pattern to retain said charge pattern, and means for obtaining an electrical signal corresponding to the distribution pattern of said electrical charge during intervals when no ultrasonic energy is arriving at said one side of said receiving plate.

8. An ultrasonic image converter comprising a receiving plate in which mechanical stresses produce a proportional potential, a source for generating and directing periodic pulses of ultrasonic pressure energy toward one side of said receiving plate, means for positioning an object to be tested between said receiving plate and said source in the path of said ultrasonic energy whereby ultrasonic energy is passed through said object to reach said one side of said receiving plate, means for flooding the other side of said receiving plate with a uniform electron flow whenever ultrasonic energy is arriving at said one side of said receiving plate, means for scanning said other side of said receiving plate during intervals when no ultrasonic energy is arriving at said one side of said receiving plate, whereby an electrical signal corresponding to the pattern of ultrasonic energy passed through said object is produced, collector means to detect said electrical signal, and means for neutralizing said other side of said receiving plate during the interval between scanning and the arrival of ultrasonic energy at said one side of said receiving plate, and control signal generating means coupled to said flooding, scanning, and neutralizing means, and to said ultrasonic source for applying control signals thereto constraining said flooding, scanning, and neutralizing means, and said ultrasonic source to operate in the specified timed relationships.

9. An ultrasonic image converter comprising a receiving plate in which mechanical stresses produce a proportional potential, a source for generating and directing periodic pulses of ultrasonic pressure energy toward one side of said receiving plate, means for positioning an object to be tested between said receiving plate and said source in the path of said ultrasonic energy whereby ultrasonic energy is passed through said object to reach said one side of said receiving plate, means for flooding the other side of said receiving plate with a uniform electron flow whenever ultrasonic energy is arriving at said one side of said receiving plate, means for scanning said other side of said receiving plate during intervals when no ultrasonic energy is arriving at said one side of said receiving plate, collector means to detect a video signal thereby produced corresponding to the pattern of ultrasonic energy passed through said object, means for presenting a visual representation of said video signal corresponding to the pattern of ultrasonic energy passed through said object, and means for neutralizing said other side of said receiving plate during the interval between scanning and the arrival of ultrasonic energy at said one side of said receiving plate, and control signal generating means coupled to said flooding, scanning, and neutralizing means, and to said ultrasonic source for applying control signals thereto constraining said flooding, scanning and neutralizing means, and said ultrasonic source to operate in the specified timed relationships.

10. An ultrasonic image converter comprising a cathode ray tube whose target electrode comprises a receiving plate in which mechanical stresses produce proportional potential, said receiving plate having an inner surface and an outer surface, a source for generating and directing periodic pulses of ultrasonic pressure energy toward said outer surface of said receiving plate, means for positioning an object to be tested between said receiving plate and said source in the path of said ultrasonic energy whereby ultrasonic energy is passed through said object to reach said outer surface of said receiving plate, said cathode ray tube having a flood electron gun for flooding said inner side of said receiving plate with a uniform electron flow whenever ultrasonic energy is arriving at said outer surface of said receiving plate, said cathode ray tube having a scan electron gun for scanning said inner surface of said receiving plate during intervals when no ultrasonic energy is arriving at said outer surface of said receiving plate, said cathode ray tube having a collector electrode for collecting electrons reflected from said inner surface of said receiving plate whenever said scan electron gun is scanning said inner surface of said receiving plate thereby producing a video signal corresponding to the pattern of ultrasonic energy passed through said object, and means including said flood electron gun for neutralizing said inner surface of said receiving plate during intervals between scanning and the arrival of ultrasonic energy at said outer surface of said receiving plate, and timing pulse generating means coupled to said ultrasonic source, flood electron gun, scan electron gun, and neutralizing means, for applying timing control pulses thereto constraining said ultrasonic source, flood electron gun, scan electron gun, and neutralizing means to operate in the specified timed relationships.

11. An ultrasonic image converter according to claim 10 having visual presentation means for presenting a visual representation of said video signal corresponding to the pattern of ultrasonic energy passed through said object.

12. An ultrasonic image converter comprising a cathode ray tube whose target electrode comprises a receiving plate in which mechanical stresses produce a proportional voltage, said receiving plate having an inner and outer surface, a source for generating an propagating periodic pulses of ultrasonic pressure energy toward said outer surface of said receiving plate, means for positioning an object to be tested between said receiving plate and said source in the path of said ultrasonic energy, whereby ultrasonic energy is passed through said object to reach said outer surface of said receiving plate, a photosensitive coating on said inner surface of said receiving plate, a light source for radiating light onto said photosensitive coating whenever ultrasonic energy is arriving at said outer surface of said receiving plate, a scan electron gun for scanning said photosensitive coating of said receiving plate during intervals when no ultrasonic energy is arriving at said outer surface of said receiving plate, and a collector electrode for collecting electrons reflected from said photosensitive coating whenever said scan gun is operative thereby producing a video signal corresponding to the pattern of ultrasonic energy passed through said object, and control signal generating means coupled to said ultrasonic source, light source, and scan electron gun, for applying timing control signals thereto constraining said ultrasonic source, light source, and scan electron gun to operate in the specified timed relationships.

13. An ultrasonic image converter according to claim 12 having visual presentation means for presenting a visual representation of said video signal corresponding to the pattern of ultrasonic energy passed through said object.

14. An ultrasonic image converter as recited in claim 10 wherein the electrons from said flood electron gun are substantially zero velocity electrons at said inner side of said receiving plate.

References Cited by the Examiner

UNITED STATES PATENTS

| 2,164,125 | 6/39 | Sokoloff | 73—67.6 |
| 2,533,381 | 12/50 | Levy et al. | 315—13 |
| 2,748,312 | 5/56 | Beintema | 315—12 |
| 2,848,890 | 8/58 | Sheldon | 73—67.5 |
| 2,866,918 | 12/58 | Hansen | 315—13 X |
| 2,872,612 | 2/59 | DeLano et al. | 315—12 |
| 2,919,574 | 1/60 | Fotland | 73—67.6 |
| 2,957,340 | 10/60 | Rocha | 73—67.5 |

RICHARD C. QUEISSER, *Primary Examiner.*

ROBERT L. EVANS, *Examiner.*